June 20, 1933.   F. SMITH   1,915,036
SHOCK ABSORBER FOR MECHANICALLY PROPELLED ROAD VEHICLES
Filed Feb. 6, 1930
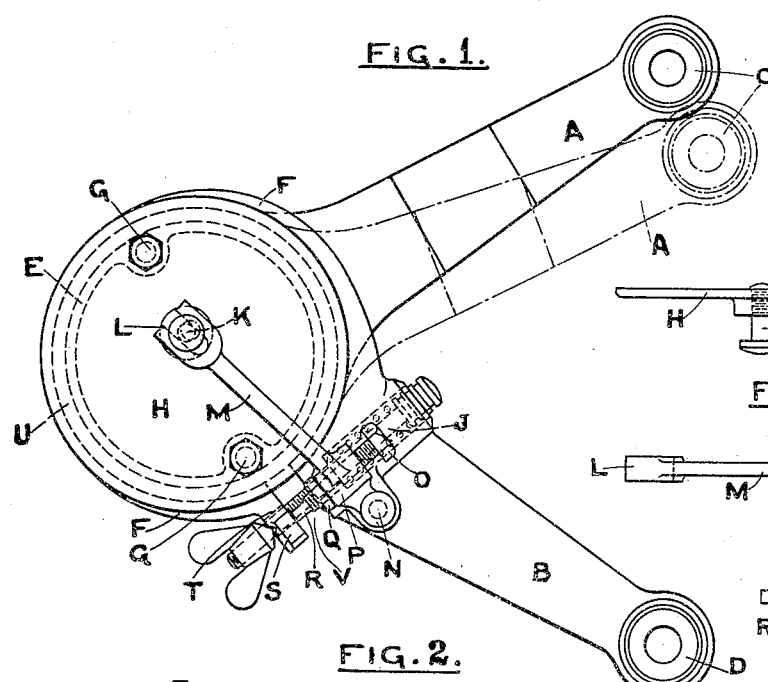
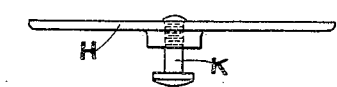
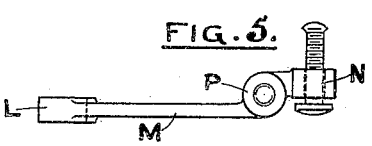
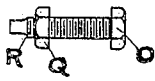
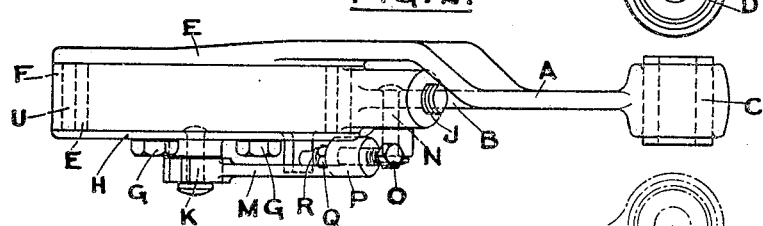
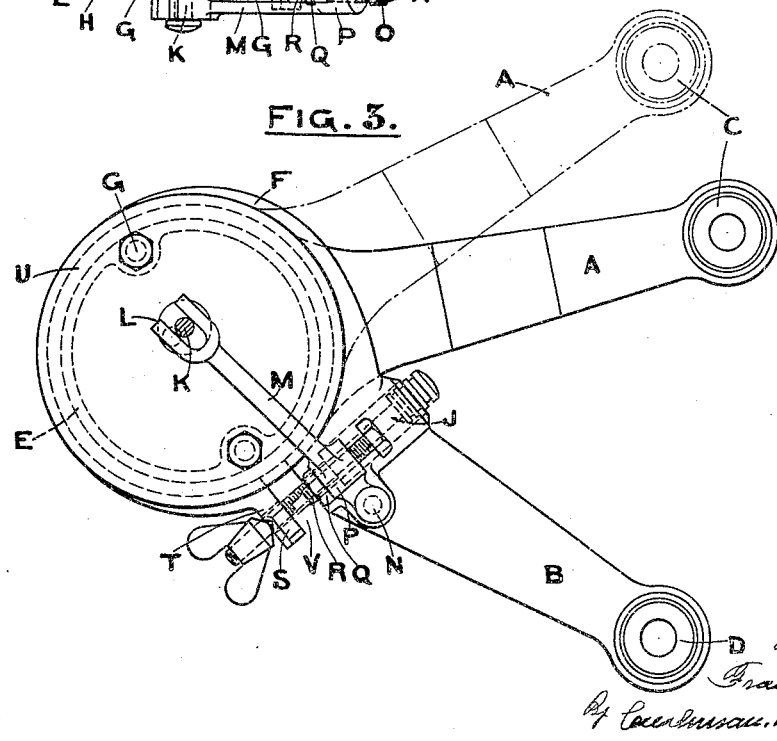

Patented June 20, 1933

1,915,036

UNITED STATES PATENT OFFICE

FRANK SMITH, OF ELLAND, ENGLAND

SHOCK ABSORBER FOR MECHANICALLY PROPELLED ROAD VEHICLES

Application filed February 6, 1930, Serial No. 426,351, and in Great Britain May 6, 1929.

The object of the present invention is an improved construction of coil friction shock absorbers, whereby the vehicle spring is enabled to function freely on the compression movement thereof, to resist or restrain the return or rebound movement of said spring up to a point therein, and then to immediately release the spring, whereby it is adapted to again function freely and independent of the shock absorbing device in both directions or movements during small deflections thereof, such as when travelling over a comparatively good road surface.

In applying the invention to coil friction shock absorbers of the kind shown and described in my prior Patent Number 1,716,468, a stud mounted in an eccentric position on the brake drum or on the cover plate secured thereto and movable integrally therewith, is adapted to engage lever mechanism pivotally connected to the normal brake band or lever to move the said mechanism, which is normally in engagement with the free end of said band, out of engagement during the compression movement of the vehicle spring. On the commencement of the return or rebound movement of the said spring, the brake drum in functioning in the well known manner in restraint of the said movement, tends to narrow the gap between the ends of the brake band; the return of the lever mechanism by the aforesaid stud causes a screw forming a part thereof to re-engage the free end of the brake band before the completion of the said rebound or recoil movement, thereby extending the gap between the ends of said band to immediately release the grip thereof on the brake drum, allowing the spring to function normally from this point throughout the rest of the movement, for the purposes before-mentioned.

I attain these objects by the means illustrated in the accompanying drawing, in which:—

Fig. 1 is a side elevation of a coil friction shock absorber showing in full lines the normal position of the support arms or levers, and in broken lines the position of one of the arms on the cutting out of the friction device to permit the vehicle spring to function normally over short deflections.

Fig. 2 is a plan view of Fig. 1.

Fig. 3 is a similar view to Fig. 1, showing the relative positions of the several elements of the lever mechanism and support arms as the compression movement of the vehicle spring approaches the maximum.

Fig. 4 is a side view of the cover-plate secured to the brake drum, carrying the stud adapted to engage and operate the lever mechanism for releasing or cutting out the friction elements of the shock absorbing device.

Fig. 5 is a plan view of lever adapted to be operated by the stud shown at Fig. 4.

Fig. 6 is a view of a threaded stud housed in the lever shown at Fig. 5 and adjustable therein, adapted to engage the brake band of the friction device for cutting out the friction elements of the shock absorbing device aforesaid.

Similar letters refer to similar parts throughout the several views.

Referring to the drawing: A, B, are the support arms or levers of a coil friction shock absorber of the kind before mentioned; C, D, are the heads of the arms A, B, respectively; E is the brake drum integral with A and F is the brake band integral with B; G are bolts securing the cover-plate H to the drum E and J is a spring device adapted to draw the ends of F together as shown and described in detail in my earlier Patent No. 1,716,468.

According to the invention, K is a stud or pin preferably integral with the plate H occupying an eccentric position thereon. Engaging the stud is the forked or slotted end L of a lever M pivotally mounted on the brake band or lever B at N. P is a boss or projection integral with the lever M, bored and tapped and adapted to house a screw R normally engaging a lug or projection S formed on the free end T of the brake band F and adjustable for this purpose according to the distance between the supporting heads C, D, when secured upon the vehicle.

Assuming the improved shock absorber is mounted on a vehicle and the vehicle is stationary, the arms A, B, occupy the relative positions shown in full lines at Fig. 1 of the drawing. While the vehicle is thus at rest, the vehicle spring may be described as in the neutral position. The screw R is then adjusted in its housing by means of the nut or the like O and lock-nut Q, to engage the lug S and widen the gap V in opposition to the tension exercised thereon by the spring device J, sufficient to prevent the shock absorbing device from functioning with the arm A occupying either of the positions shown in full lines and in broken lines at Fig. 1 of the drawing. The distance between these positions represents the traverse of said arm A in short deflections of the spring mounted vehicle frame, during which the arm A attached to the frame functions freely without interference from the shock absorber.

On a compression movement of the vehicle spring and as the axle and frame move toward one another, due to the usual causes, the friction elements of the shock absorbing device slip substantially freely in the well known manner. This operation necessarily follows from the relation of the brake band F, rigidly secured at one end to the arm B, and yieldably mounted by means of the pin J and its associated spring at the other end. When the brake drum E rotates in a clockwise direction (Figs. 1 and 3) upon such compression of the vehicle spring, the brake band F is substantially inoperative throughout the entire movement because of an unwrapping tendency of the band against the yieldable mounting. When the drum rotates in a counterclockwise movement, upon rebound movement of the vehicle frame away from the axle toward neutral position of the spring, the band F has a wrapping tendency around the drum against the rigidly mounted end. Thus, rebound movement of the vehicle frame is effectively restrained during an initial portion of its movement, although compressive movement of the vehicle spring is substantially unrestrained during its entire movement. As the arm A approaches the arm B during such a compressive movement, the drum H moves the stud K in the fork L of lever M, eccentrically to the friction surfaces, and the screw R away from the lug S, so that on the arm A reaching the position shown in broken lines at Fig. 1, the gap V has been returned to the normal and the screw R is on the point of moving out of engagement with the lug S, allowing the shock absorbing device to function in the normal manner. If the shock, or the deflection of the vehicle spring from neutral position is such as to move the arm A into the position shown in full lines at Fig. 3, the stud K moving integrally with the member H, operates the lever M to move the screw R out of engagement with the said lug S during the rest of the movement. Upon the commencement of the return or rebound movement of the vehicle frame, the friction elements of the shock absorbing device exercise the usual slipping grip on the drum H in the well known manner until the arm A again reaches the position shown in broken lines at Fig. 1 of the drawing, with the screw R in operative engagement with the lug S. From this point, the gap V is again widened by the continued operation of the lever M by the stud K, cutting out the friction elements of the shock absorbing device as before described, and allowing the vehicle frame to move freely during the rest of the rebound movement.

By adjusting the screw R for the purpose of accelerating or retarding its engagement with the lug S, the point at which the shock absorbing device is cut out on the rebound movement, may be varied as desired.

What I claim as my invention, and desire to secure by Letters Patent, is:—

1. In a shock obsorber, the combination with brake devices adapted to restrain movement between a vehicle axle and a spring mounted frame, of means actuated by relative movement between the axle and frame for rendering said devices substantially inoperative throughout the compression movement of the spring and during the final portion of rebound movement thereof toward neutral position of said springs.

2. In a shock absorber, the combination with brake devices, adapted to be interposed between a vehicle axle and a spring mounted frame to restrain rebound movement of the frame under the influence of the spring, of means for automatically rendering said devices inoperative from a predetermined point in the said rebound movement to the completion of such movement.

3. In a shock absorber, the combination with brake devices, a vehicle spring, and means whereby relative movement between the brake devices and spring is adapted to restrain rebound movement of the spring, of means for automatically rendering said devices inoperative from a predetermined point in the rebound movement of the spring to the completion of such movement, and means for varying the period in which said devices are inoperative.

4. In a shock absorber, the combination with a friction drum and coacting brake band adapted to restrain relative movement between a vehicle axle and a spring mounted frame, of means actuated by relative movement between said drum and band for substantially relieving the drum of the braking action of the band throughout the movement of the frame toward the axle and during the final portion of the recoil movement thereof toward the neutral position of the spring.

5. In a shock absorber, the combination with two arms mounted to rock about a common axis, and respectively provided with coacting friction members adapted to restrain movement of a vehicle spring as said arms move away from each other, of a lever fulcrumed on one of said arms, and means connected with the other arm and movable in a path eccentric to the axis of said arm adapted to rock said lever to affect disengagement of the friction members during an initial portion of the compression movement of the spring and during the final portion of the rebound movement thereof.

6. In a shock absorber, the combination with two arms mounted to rock about a common axis, and respectively provided with coacting drum and brake band adapted to restrain movement of a vehicle spring as said arms move away from each other, of a lever fulcrumed on the arm connected to the brake band, and a pin mounted on the drum eccentric to the axis thereof and adapted to cooperate with said lever to rock the latter to cause it to move the brake band from operative relation to the drum during an initial portion of the compression movement of the spring and during the final portion of the rebound movement thereof.

7. A shock absorber assembly adapted to be interposed between the axle and the spring supported frame of a vehicle to restrain rebound movement of said frame from the axle under the influence of the vehicle spring, said assembly comprising a brake device and means actuated by movement of said frame for controlling the operativeness of said brake device, said means being adapted to render said brake device operative during an initial portion of said rebound movement of said frame, and inoperative during the final portion of said rebound movement toward neutral position of said spring.

In testimony whereof I affix my signature.

FRANK SMITH.